United States Patent
Poss et al.

(10) Patent No.: US 6,851,385 B1
(45) Date of Patent: Feb. 8, 2005

(54) PET BED HAVING ORTHOPEDIC PROPERTIES

(76) Inventors: Wendy Poss, 5320 Hendrickson Cir., Anchorage, AK (US) 99507; Michael Poss, 5320 Hendrickson Cir., Anchorage, AK (US) 99507

(*) Notice: Subject to any disclaimer, the term of this patent is extended or adjusted under 35 U.S.C. 154(b) by 0 days.

(21) Appl. No.: 10/688,490

(22) Filed: Oct. 16, 2003

(51) Int. Cl.[7] .............................................. A01K 29/00
(52) U.S. Cl. ................................................... 119/28.5
(58) Field of Search ............................... 119/28.5, 171, 119/482, 496, 497; 5/731, 730, 736, 653, 655, 946

(56) References Cited

U.S. PATENT DOCUMENTS

| | | | | |
|---|---|---|---|---|
| 4,631,766 A | * | 12/1986 | Semmler et al. | 5/655 |
| 5,136,981 A | * | 8/1992 | Barreto et al. | 119/28.5 |
| D400,313 S | * | 10/1998 | Chatwell | D30/118 |
| 5,826,537 A | * | 10/1998 | Heilborn | 119/28.5 |
| D414,003 S | * | 9/1999 | Hering | D30/118 |
| 6,026,527 A | * | 2/2000 | Pearce | 5/654 |
| 6,079,067 A | * | 6/2000 | Becker et al. | 5/655 |
| 6,196,156 B1 | * | 3/2001 | Denesuk et al. | 119/28.5 |
| 6,256,822 B1 | * | 7/2001 | Weston et al. | 5/732 |

* cited by examiner

Primary Examiner—Son T. Nguyen
(74) Attorney, Agent, or Firm—Michael J. Tavella

(57) ABSTRACT

A pet bed that is modeled after the anatomy of the canine shape. It uses a specially designed comfort area in the top pad that aligns with the hip and shoulder areas to provide a supportive and conforming area to help improve blood flow to the hips and legs. It also has a honeycomb support system molded into the base that aids in adjusting the overall pressure across the entire surface of the bed, making the bed truly form fitting. A back and head/neck rest support are also included. These areas are designed to allow the pet to choose a multiple of head/neck and paw placements to allow complete comfort with all of the therapeutic support benefits that the pet requires.

20 Claims, 7 Drawing Sheets

PET BED HAVING ORTHOPEDIC PROPERTIES

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to orthopedic pet beds and particularly to orthopedic pet beds having sculpted supports formed therein to provide maximum comfort for pets.

2. Description of the Prior Art

Pet beds are available on the market that run from simple stuffed pillows to more sophisticated "orthopedic" style beds. Although these so-called "orthopedic" pet beds exist in the market, none are designed using technologies that have been available to the human disability population. Most pet beds on the market use an egg "create" type foam, or a bag that is filled with poly-fill or cedar chips and call it "orthopedic". These materials are not moisture resistant, due to their open cell design or their ability to absorb and hold fluids, like cedar chips. Most pet beds lack proper support, especially for older dogs that may be suffering from joint diseases. In addition, most "orthopedic" pet beds require the pet to "step up" in many cases as much as 8 inches or more to get into the bed. This causes the pet to strain its joints and muscles even more. Moreover, few pet bed products on the market today address that most pets feel more secure in a bed that wraps around them in the back.

Examples of pet beds range from large stuffed pillow type forms, to small, formed foam beds that are covered with cloth or other materials. Some specific designs are found in the following U.S. Patents: U.S. Pat. No. 5,265,558 teaches a better method of making foam beds. The bed is formed in a mode and has a base with curved sidewalls and a section that forms an opening for entry and egress. The bed is designed to be covered with a fabric. U.S. Pat. No. 6,553,935 teaches a dog bed that has a base made of plastic. It has a hinged top that has numerous perforations. A fan is placed in the base, as well as a heating or cooling element. Thus, the bed has a system for maintaining a desired temperature for the animal. Note however, that the bed has minimal structures for comfort, as it appears rigid. Two U.S. Design Patents show typical bed forms. In D295,904 to McMahon, a rectangular bed is shown that has a base and three rectangular sidewalls, forming a "U" shaped arm structure, similar to a couch. In D351,687, also to McMahon, the bed has a lower body that has curved arms and a back as a one-piece structure and an inner rectangular pad.

BRIEF DESCRIPTION OF THE INVENTION

The instant invention overcomes all of these problems. It is a pet bed that, unlike prior art beds, is modeled after the anatomy of the canine shape. It uses a specially designed comfort area in the top pad that aligns with the hip and shoulder areas to provide a supportive and conforming area to help improve blood flow to the hips and legs. This feature also reduces the "shearing" action on the skin and coat, while at the same time providing airflow under the pet to aid in their overall comfort.

The bed has a "step up" of less than 2 inches, which reduces joint strain on the pet as it enters the bed.

The base of the instant invention has a honeycomb support system molded into the base that aids in adjusting the overall pressure across the entire surface of the bed, making the bed truly form fitting.

The instant invention incorporates sculpted back and head/neck rest support areas. These areas are designed to allow the pet to choose a multiple of head/neck and paw placements to allow complete comfort with all of the therapeutic support benefits that the pet requires.

Unlike commonly used technologies like upholstery foam, cedar filled bags, or hospital type egg crate foam mattress materials that are not moisture resistant, the instant invention is molded from polyurethane medical grade closed cell foam that is resistant to absorbing moisture and body fluids. This allows for easy clean up following an accident.

Moreover, few pet bed products on the market today address that most pets feel more secure in a bed that wraps around them in the back. The instant invention uses a contoured, multi-level back and sidewall structure that not only supports, but wraps around the animal, making it a favorite safe place to relax.

DETAILED DESCRIPTION OF THE INVENTION

Figure 1:
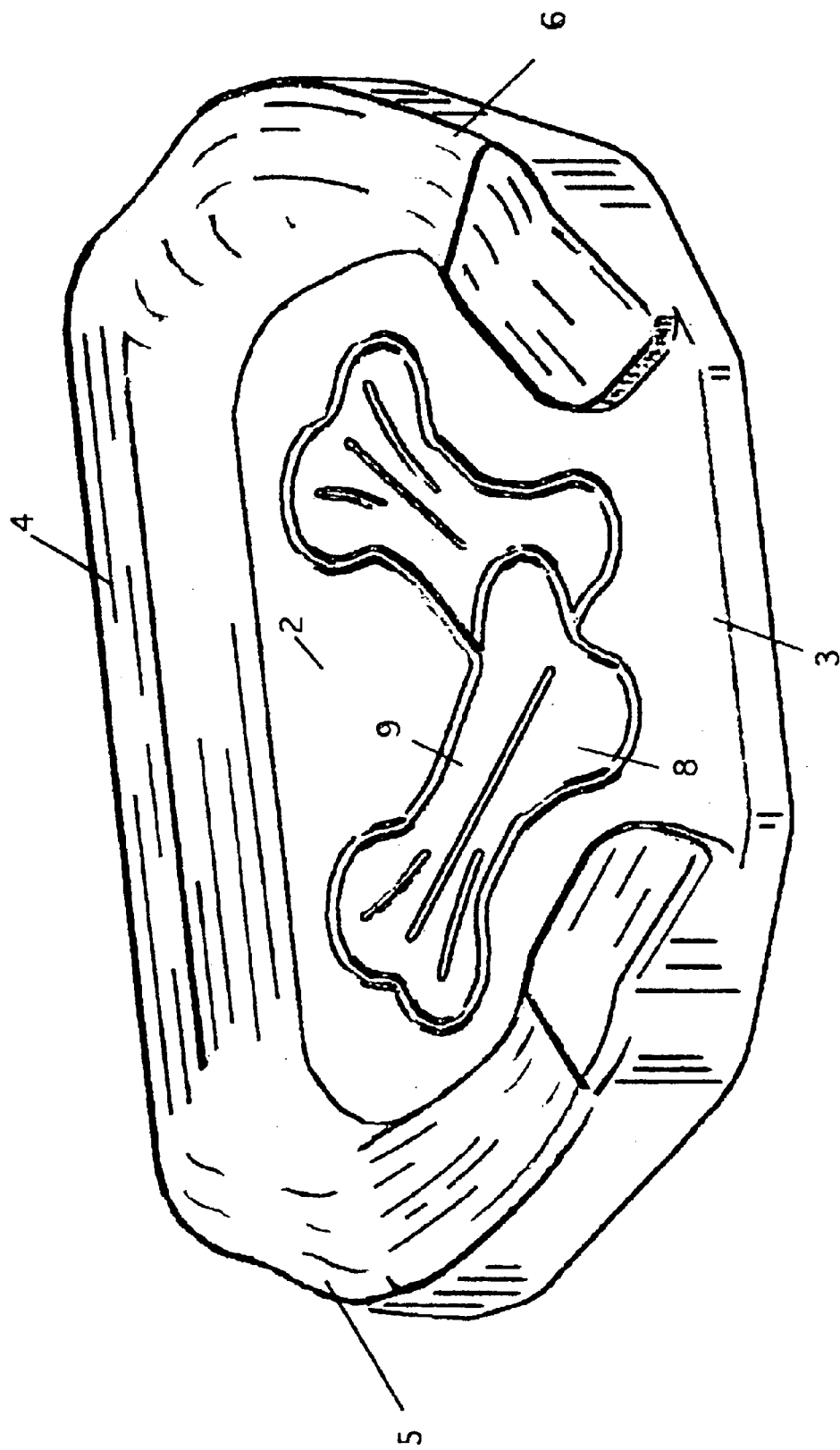
FIG. 1 is a perspective view of the invention.

Referring now to FIGS. 1, 2, 4, 6 and 7, the pet bed 1 has a generally flat center base portion 2, an open front portion 3, a raised back portion 4 and two sculpted side portions 5 and 6. In the generally flat center base portion 2, there is formed a sculpted area 7. This area is a specially formed comfort zone what is designed to align with a pet's hip and shoulder areas to provide a supportive and conforming area to help improve blood flow to the hips and legs. These features also reduce the "shearing" action on the skin and coat, while at the same time providing airflow under the pet to aid in their overall comfort. As shown in the FIGS., this sculpted area 7 is shaped like a pair of dog bone type biscuits. Although this is done in part for appearance, the shape is ideal for the supporting nature of the zone, as discussed above. It is not enough to say that any other design can be used for the zone. Care must be used to provide the proper positioning of the support. The sculpted area 7 has a recessed perimeter groove 8 surrounding a center portion 9. Grooves 10 and 11 are also formed in the center portions 9 as shown. The grooves 10 and 11 improve airflow under the pet.

Figure 2:
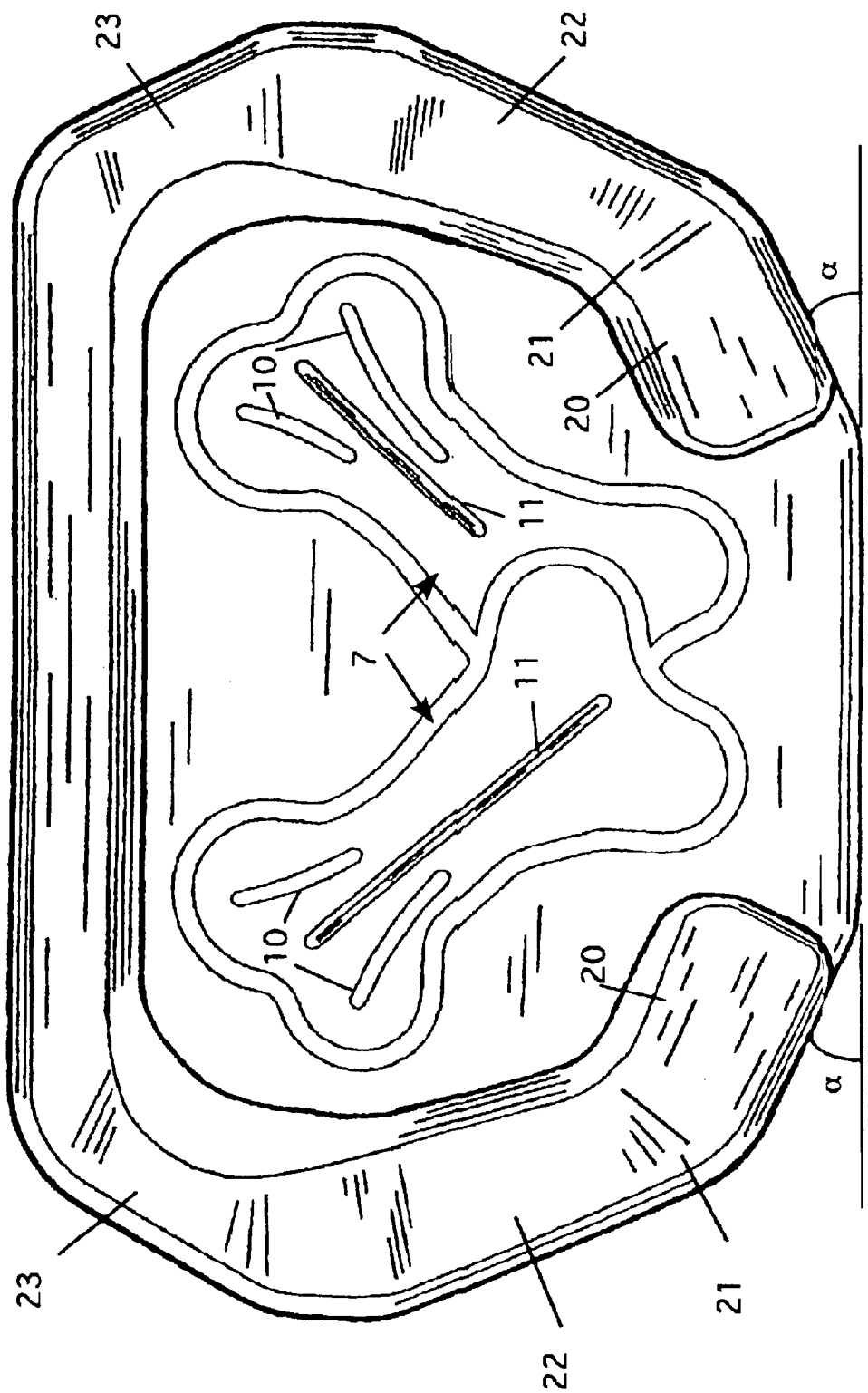
FIG. 2 is a top plan view of the invention.
Figure 4:
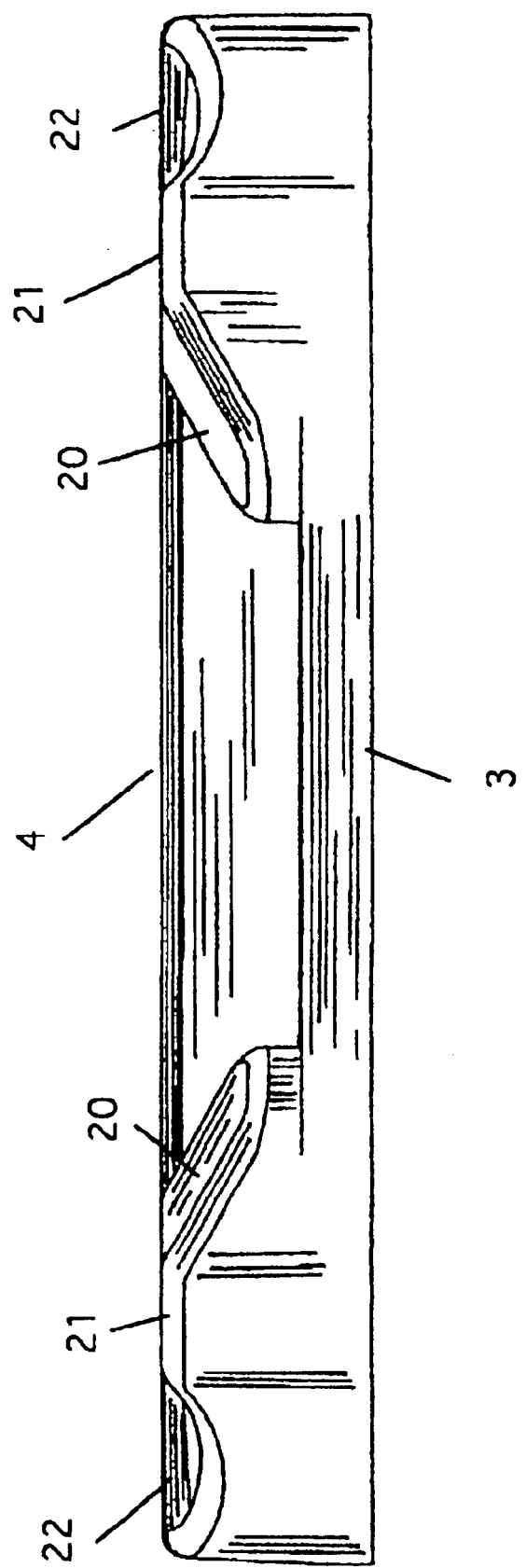
FIG. 4 is a front elevational view of the invention.
Figure 5:
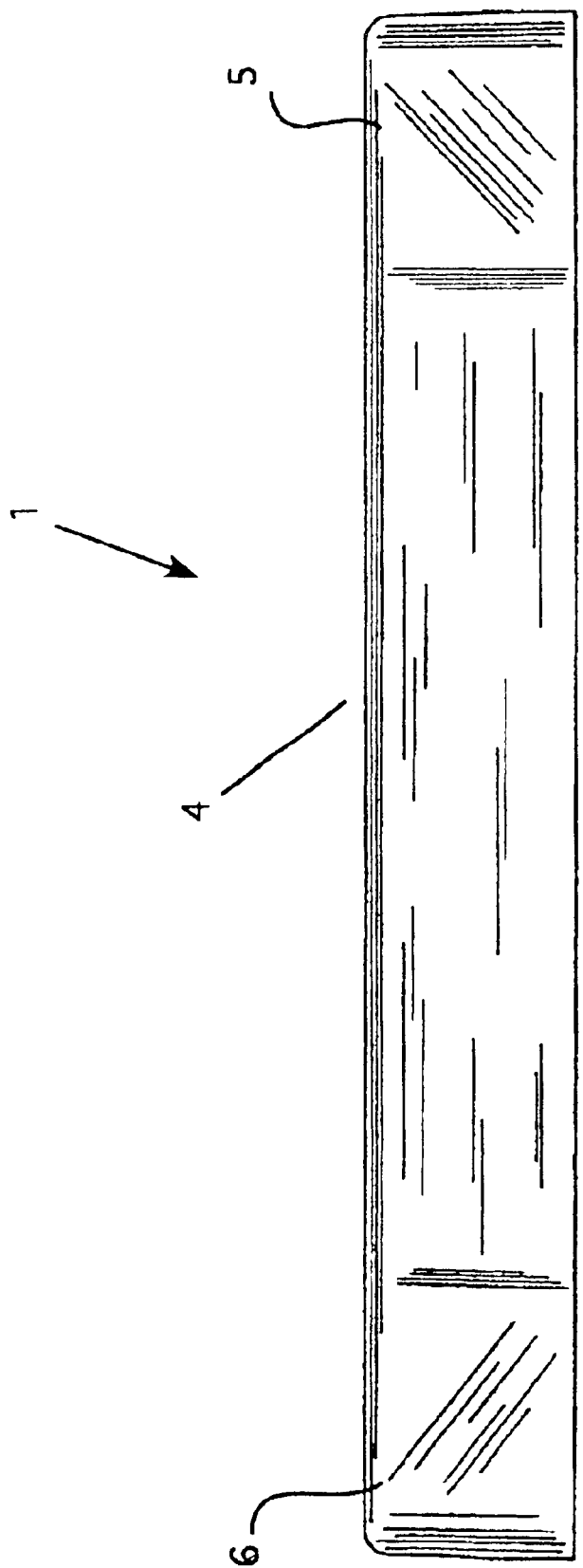
FIG. 5 is a back elevational view of the invention.
Figure 6:
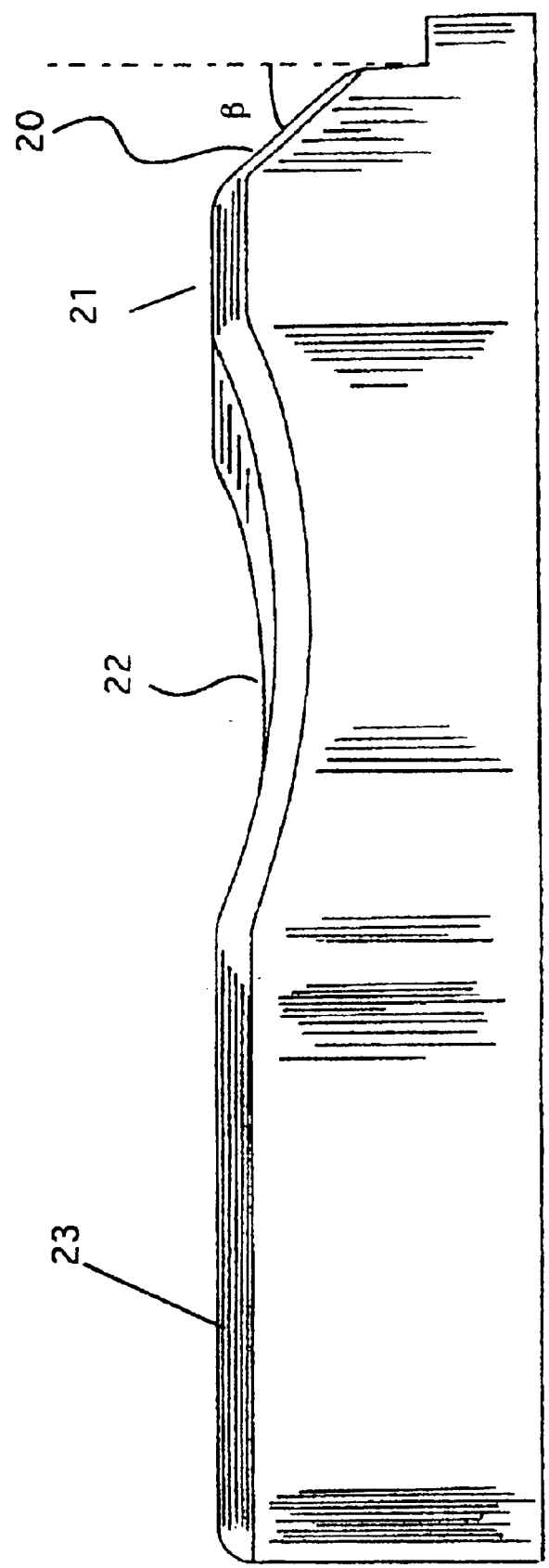
FIG. 6 is a left side elevational view of the invention.
Figure 7:
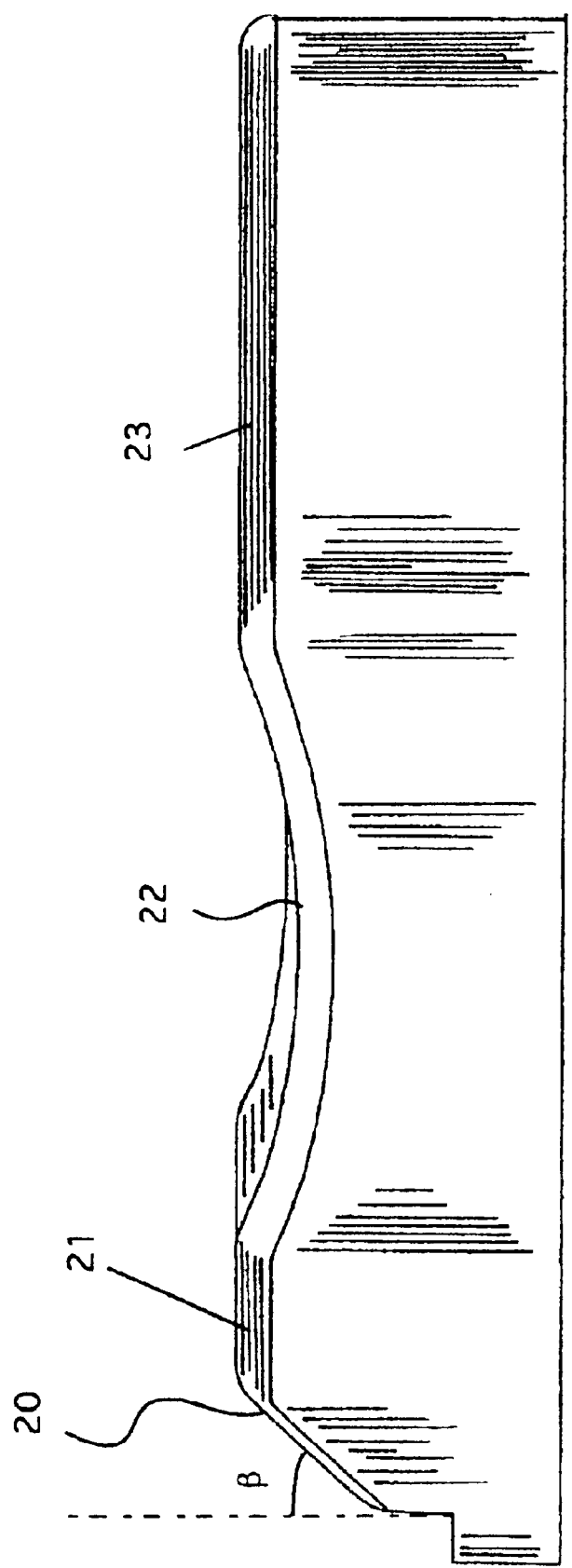
FIG. 7 is a right side elevational view of the invention.

While it is possible for a small pet to fit within the generally flat center base portion 2, the bed has raised sides 5 and 6 and a raised back 4. These allow the animal to rest its neck and paws on these elements in any manner to achieve maximum comfort. The raised back 4 is level and straight as shown; the sides 5 and 6 are not. These elements are also sculpted to achieve maximum comfort. Note that as shown in FIGS. 6 and 7, the two sides 5 and 6 are mirror images of each other. Referring now to FIGS. 2, 4, 6 and 6, the sides 5 and 6 wrap around from the back 4 to the front of the bed. The sides end at the front, forming the open front portion 3 front portion 3 is shown in FIG. 4.

The sides have compounded angles running from the front to the back. FIG. 2 shows the forward part 20 of the sides 5 and 6 extends back at an angle α. In the preferred embodiment, angle α is 22 degrees with respect to the line of the front of the bed. However, angle α can be between about 15 and 30 degrees. At the same time, this portion rises up at an angle β of approximately 45 degrees in the preferred embodiment (see FIG. 6). However, angle β can be between about 30 and 55 degrees. As shown in FIG. 2, the sides continue to curve around until they connect with the back 4. However, as the sides continue around to the back, the do not remain at the same level. In the preferred embodiment, the sides level off for a short length 21. After that, a curved recessed portion 22 is formed on each of the sides, as shown. After the curved recessed portion, the sides again flatten out in a flat portion 23, and remain flat until they meet the flat back portion 4. FIGS. 2, 4, 6, and 7 show that the curved portion 22 runs back at a second angle with respect to the forward part 20 of the arms. Note also that the flat portion 23 has a different angle that that of the curved portions 22. The effect of these angles portions is to produce an overall curved shape from front to back, as shown in FIG. 2.

Figure 3:
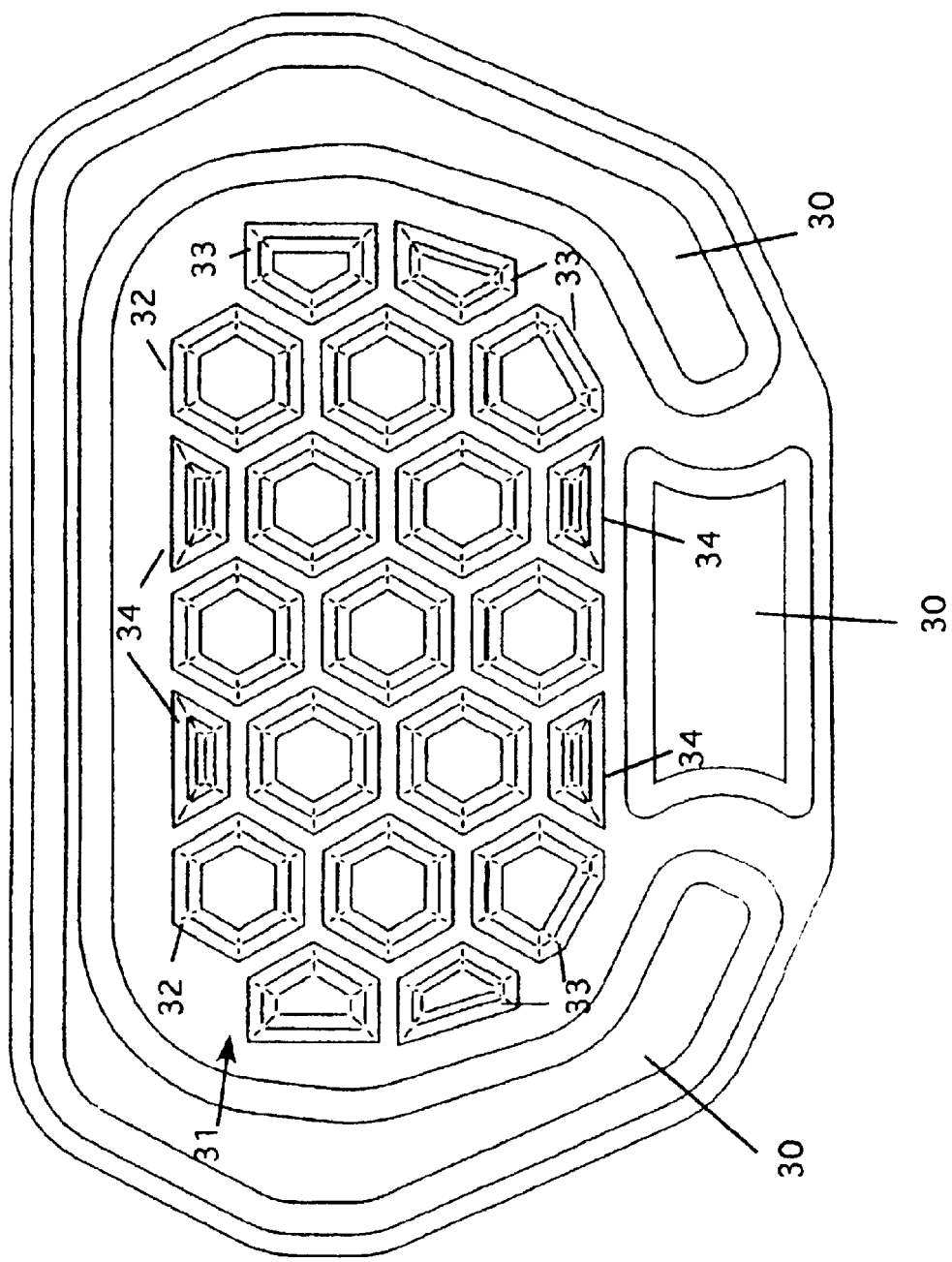
FIG. 3 is a bottom plan view of the invention.

FIG. 3 shows the bottom of the bed. As shown, the base has molded perimeter supports 30 to help maintain the bed's shape. In the center of the base is a honeycomb support system 31 molded into the base, This honeycomb support system aids in adjusting the overall pressure across the entire surface of the flat portion of the bed, thereby making the bed truly form fitting for a particular animal. In the preferred embodiment, the honeycomb support system 31 has hexagonal sections 32 honeycomb support system, pentagonal sections 33 and four parallelogram shaped sections 34. The placement of these sections is not done randomly. The placement is designed to produce the optimum weight distribution across the generally flat center base portion 2.

The honeycomb support system 31 on the bottom surface also acts to create a dead air space, which helps insulate the pet from temperature differences if the bed is placed on a cold or hard surface.

In the preferred embodiment, the bed is molded of polyurethane closed cell foam or visco-elastic foam of in some combination of the two. The pet bed can also be given a coating of vinyl or other "spray-on" soft plastic coating to cover any or all of its surfaces to improve moisture and abrasion resistance, without significant loss of its orthopedic properties.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A pet bed comprising:

a) a generally flat center section, having an open front area, a top, and a bottom;
   b) a pair of formed side arms fixedly attached to said generally flat center section; and
   c) a raised back portion fixedly attached to said generally flat center section;
   d) wherein each of said pair of formed side arms includes a front portion having a compound angle wherein the front portion extends rearward from said open front area at a first angle α, and simultaneously rising upward from said open front area at a second angle β, and further wherein each of said pair of side arms has a curved recessed portion, formed between said front portion of said side arm and said raised back portion of said bed.

2. The pet bed of claim 1 further comprising a honeycomb support system formed in the bottom of the generally flat center section.

3. The pet bed of claim 2 wherein the honeycomb support system comprises:

a) a plurality of hexagonal sections;
   b) a plurality of pentagonal sections; and
   c) a plurality parallelogram shaped sections.

4. The pet bed of claim 1 further comprising a sculpted area formed in the top of the generally flat center section.

5. The pet bed of claim 4 wherein sculpted area has a formed shape.

6. The pet bed of claim 5 wherein the formed shape is shaped like a pair of dog bone type biscuits.

7. The pet bed of claim 4 wherein the sculpted area further comprises:

a) a perimeter groove; and
   b) a center portion within said perimeter groove.

8. The pet bed of claim 7 wherein the sculpted area further comprises: a plurality of formed grooves formed in the center portion of said sculpted area.

9. The pet bed of claim 4 wherein the sculpted area forms a comfort zone, designed to align with a pet's hip and shoulder areas to provide a supportive and conforming area to help improve blood flow to the hips and legs of the pet.

10. The pet bed of claim 1 wherein the pet bed is made of closed cell foam.

11. The pet bed of claim 1 wherein the pet bed is formed in a mold.

12. The pet bed of claim 1 wherein a first angle α is between about 15 and 30 degrees.

13. The pet bed of claim 1 wherein second angle β is between about 30 and 50 degrees.

14. The pet bed of claim 1 wherein a first angle α is 22 degrees.

15. The pet bed of claim 1 wherein second angle β is 45 degrees.

16. The pet bed of claim 1 wherein the pet bed is made of visco-elastic foam.

17. The pet bed of claim 1 wherein the pet bed further comprises a vinyl coating adhered to said pet bed.

18. The pet bed of claim 17 wherein the vinyl coating is sprayed onto said pet bed.

19. The pet bed of claim 1 wherein the pet bed further comprises a soft plastic coating adhered to said pet bed.

20. The pet bed of claim 19 wherein the soft plastic coating is sprayed onto said pet bed.

* * * * *